United States Patent
Shang

(10) Patent No.: US 11,620,170 B1
(45) Date of Patent: Apr. 4, 2023

(54) METHOD, APPARATUS, DEVICE AND STORAGE MEDIUM FOR FUNCTION PROCESSING

(71) Applicant: BEIJING BYTEDANCE NETWORK TECHNOLOGY CO., LTD., Beijing (CN)

(72) Inventor: Chaoyang Shang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/719,666

(22) Filed: Apr. 13, 2022

(30) Foreign Application Priority Data

Dec. 24, 2021 (CN) .......................... 202111598174.9

(51) Int. Cl.
  *G06F 9/54* (2006.01)
(52) U.S. Cl.
  CPC ................... *G06F 9/541* (2013.01)
(58) Field of Classification Search
  CPC combination set(s) only.
  See application file for complete search history.

(56) References Cited

U.S. PATENT DOCUMENTS

| | | | | |
|---|---|---|---|---|
| 2011/0093691 | A1* | 4/2011 | Galicia | G06F 9/4406 713/2 |
| 2012/0304160 | A1* | 11/2012 | Soeder | G06F 9/4486 717/148 |
| 2014/0282431 | A1* | 9/2014 | Delio, Jr. | G06F 11/3093 717/130 |
| 2015/0142781 | A1* | 5/2015 | Nigam | G06F 16/20 707/722 |
| 2015/0172153 | A1* | 6/2015 | Sharma | G06F 9/545 709/224 |
| 2016/0337104 | A1* | 11/2016 | Kalligudd | H04L 61/4511 |
| 2018/0302443 | A1* | 10/2018 | Weiss | G06F 21/604 |

OTHER PUBLICATIONS

Wolters, "DLL Injection Part 1: SetWindowsHookEx", pp. 1-8. (Year: 2015).*

* cited by examiner

*Primary Examiner* — S. Sough
*Assistant Examiner* — Phuong N Hoang

(57) ABSTRACT

Embodiments of the present disclosure provide a method, apparatus, device and storage medium for function processing. The method comprises: loading a first core library in a preset application program, wherein the first core library injects a proxy connect function in the first core library to a second core library to perform centralized management of the invoking of a preset socket, the second core library including a preset connect function, the preset connect function being used to establish a connection with the preset socket; injecting a custom connect function to the second core library based on a preset injection method corresponding to the proxy connect function; in accordance with a determination that the preset application program invokes the preset connect function via the second core library, invoking the custom connect function instead to implement a custom logic so as to delegate the preset socket. With the above technical solution, the injection of codes for delegating socket can be reduced, and the stability and performance of the application program can be guaranteed.

14 Claims, 4 Drawing Sheets

METHOD, APPARATUS, DEVICE AND STORAGE MEDIUM FOR FUNCTION PROCESSING

FIELD

Embodiments of the present disclosure relate to the computer technical field, and more specifically, to a method, apparatus, device and storage medium for function processing.

BACKGROUND

A socket, also known as a socket interface, is an application programming interface (API) for inter-process communication in a network environment. The socket is the underlying interface for network capabilities on many operating system platforms. In order to monitor the network status of an application program, it is often necessary to delegate the socket related to the network capability of the application program.

Currently, in order to have a full understanding of the network status, it is necessary to inject custom code in all places where sockets are invoked to achieve the purpose of deligation, such as in the common procedure linkage table hook technology. Existing deligation schemes inject a lot of content, which affects the overall stability and performance of the application program, so they are not perfect.

SUMMARY

Embodiments of the present disclosure provide a method, apparatus, storage medium and device for function processing, which may optimize existing solutions for function processing.

In a first aspect, the embodiments of the present disclosure provide a method for function processing, comprising: loading a first core library in a preset application program, wherein the first core library injects a proxy connect function in the first core library to a second core library to perform centralized management of the invoking of a preset socket, the second core library including a preset connect function, the preset connect function being used to establish a connection with the preset socket; injecting a custom connect function to the second core library based on a preset injection method corresponding to the proxy connect function; in accordance with a determination that the preset application program invokes the preset connect function via the second core library, invoking the custom connect function instead to implement a custom logic so as to delegate the preset socket.

In a second aspect, the embodiments of the present disclosure provide an apparatus for function processing, comprising: a loading module configured to load a first core library in a preset application program, wherein the first core library injects a proxy connect function in the first core library to a second core library to perform centralized management of the invoking of a preset socket, the second core library including a preset connect function, the preset connect function being used to establish a connection with the preset socket; an injection method invoking module configured to inject a custom connect function to the second core library based on a preset injection method corresponding to the proxy connect function; a connect function invoking module configured to, in accordance with a determination that the preset application program invokes the preset connect function via the second core library, call the custom connect function instead to implement a custom logic so as to delegate the preset socket.

In a third aspect, the embodiments of the present disclosure provide an electronic device, comprising: a memory, a processor and a computer program stored on the memory and capable of running on the processor, the processor executing the computer program to implement a method for function processing as provided by the embodiments of the present disclosure.

In a fourth aspect, the embodiments of the present disclosure provide a computer readable storage medium, with a computer program stored thereon, the program, when executed by a processor, implementing a method for function processing as provided by the embodiments of the present disclosure.

With the solution for function processing provided in the embodiments of the present disclosure, a first core library is loaded in a preset application program, wherein the first core library injects a proxy connect function to a second core library to perform the centralized management of the invoking of a preset socket, the second core library comprising a preset connect function used to establish a connection with the preset socket. A custom connect function is injected to the second core library based on a preset injection method corresponding to the first core library. In accordance with a determination that the preset application program invokes a preset connect function via the second core library, the custom connect function is invoked instead to delegate the preset socket. With the above technical solution, it is not necessary to inject the custom code at each place where the socket needs to be invoked so as to achieve the purpose of delegating the socket. By injecting the custom connect function to the second core library by using a preset injection method that can inject a proxy connect function to the second core library, the custom connect function can have the functionality of the proxy connect function to perform the centralized management of the invoking of the preset socket. In other words, with one injection of the custom connect function, the effect of batch injection of multiple delegation codes corresponding to the preset socket can be realized. Therefore, the injection of the codes for delegating socket can be reduced, and the stability and performance of the application program can be guaranteed.

DETAILED DESCRIPTION OF IMPLEMENTATIONS

Embodiments of the present disclosure will be described in more detail with reference to the accompanying drawings, in which some embodiments of the present disclosure have been illustrated. However, it should be understood that the present disclosure can be implemented in various ways, and thus should not be construed to be limited to embodiments disclosed herein. On the contrary, these embodiments are provided for the thorough and complete understanding of the present disclosure. It should be understood that the drawings and embodiments of the present disclosure are merely for the illustration propose and not limiting the protection scope of the present disclosure.

It should be understood that various steps described in method embodiments of the present disclosure may be performed in a different order and/or in parallel. In addition, the method embodiments may comprise an additional step and/or omit a step which is shown. The scope of the present disclosure is not limited in this regard.

The term "comprise" and its variants used here are to be read as open terms that mean "include, but is not limited to." The term "based on" is to be read as "based at least in part on". The term "one embodiment" are to be read as "at least one embodiment." The term "another embodiment" is to be read as "at least one other embodiment." The term "some embodiments" are to be read as "at least some embodiments." Other definitions will be presented in the description below.

Note that the concepts "first," "second" and so on mentioned in the present disclosure are only for differentiating different apparatuses, modules or units rather than limiting the order or mutual dependency of functions performed by these apparatuses, modules or units.

Note that the modifications "one" and "a plurality" mentioned in the present disclosure are illustrative rather than limiting, and those skilled in the art should understand that unless otherwise specified, they should be understood as "one or more."

The names of messages or information exchanged between multiple apparatuses in the embodiments of the present disclosure are for illustrative purposes only, and are not used to limit the scope of these messages or information.

Each embodiment among the following embodiments provides both optional features and examples, and various features described in the embodiments may be combined to form multiple optional solutions, and each numbered embodiment should not be regarded as only one technical solution.

Figure 1:
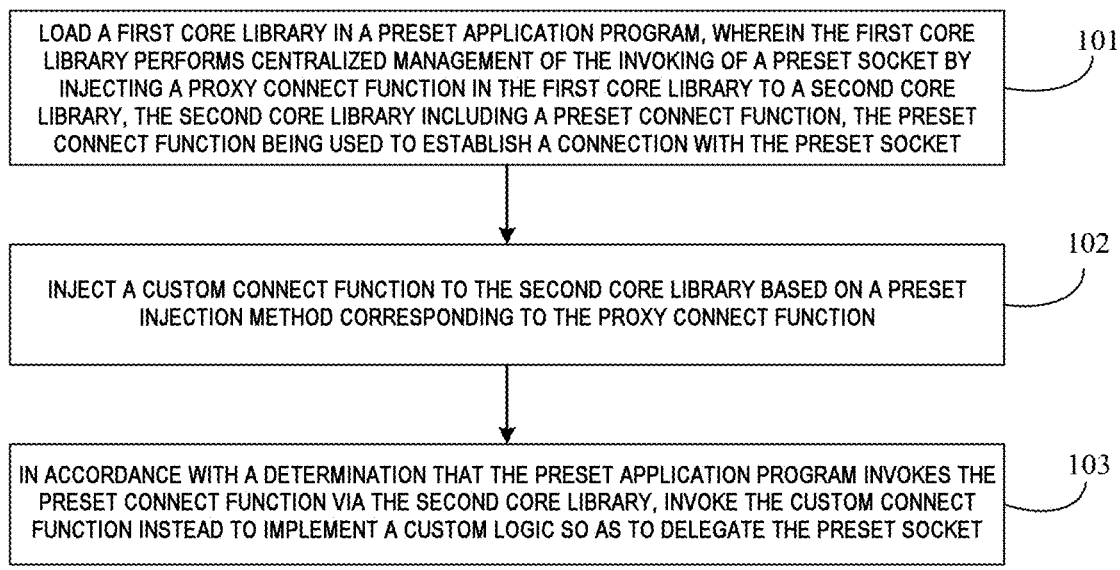
FIG. 1 shows a schematic flowchart of a method for function processing provided by embodiments of the present disclosure.

FIG. 1 is a flowchart of a method for function processing provided by an embodiment of the present disclosure. The method may be applicable to a preset application program and may be performed by a function processing apparatus, wherein the apparatus may be implemented by software and/or hardware and generally integrated in an electronic device. The electronic device may be a mobile device such as a mobile phone, a smart watch, a tablet computer and a personal digital assistant; it may also be other devices such as a desktop computer.

As shown in FIG. 1, the method comprises:

At step 101, a first core library is loaded in a preset application program, wherein the first core library injects a proxy connect function in the first core library to a second core library to perform the centralized management of the invoking of a preset socket, the second core library including a preset connect function, the preset connect function being used to establish a connection with the preset socket.

As an example, the preset application program may be any application program having network accessing capabilities. The preset application program is loaded in an operating system, and the type of the operating system is not limited, and for example, may include Unix, Linux, Apple (iOS, macOS or OS X) and Android, etc. For the convenience of explanation, Android will be taken as an example below.

As an example, the core library may also be referred to as a kernel library and may be understood as a library for providing basic functions in the operating system. The application program needs to use the socket when performing the network capability. The socket is implemented in the second core library, and the implementation of the socket comprises a connect function, also known as a connect method. The connect function, as the implementation of the socket, may be used to establish a connection with the corresponding socket. When the application program initiates a connection action of a network request and needs to call the socket, the connect function corresponding to the socket may be invoked. In different operating systems, the second core library might have different names Taking Android for example, the second core library may be a Bionic library. The first core library is a different core library than the second core library. Since sockets need to be invoked at many places, in order to facilitate the management, the first core library can aggregate sockets at the system level and proxy the real implementation of the socket in the second core library to the first core library. The first core library may inject its own implementation of the socket (may be called as proxy connect function) into the second core library, so that when the connect function in the second core library is executed, the proxy connect function will be executed first, and further the centralized management of the invoking of the socket is performed. In different operating systems, the second core library might have different names Taking Android for example, the second core library may be a NetdClient library, and the corresponding library file may be a libnetd_client.so file.

As an example, the preset socket may comprise all or part of sockets implemented in the second core library, and accordingly, the preset connect function may comprise all or part of connect functions existing in the second core library, which corresponds to the preset socket.

As an example, the preset application program may proactively load the first core library after being started, or load the first core library in accordance with a determination that a load event of the first core library is triggered. Optionally, the second core library may be loaded at a time that is the same as or different from the first core library.

At step 102, a custom connect function is injected to the second core library based on a preset injection method corresponding to the proxy connect function.

As an example, the preset injection method corresponding to the proxy connect function may be understood as an injection method that can inject the proxy connect function to the second core library. The method may be written according to actual needs or re-use the injection method provided by the operating system. Optionally, the preset injection method comprises a method for injecting the proxy connect function in the first core library to the second core library as provided by the operating system.

Taking Android as an example, the preset injection method comprises a NetdClientInitConnect method. The method is exposed to the public by the Android operating system, and the preset application program may obtain the method and further call the method.

As an example, the custom connect function may be injected to the second core library by invoking the preset injection method.

In the embodiments of the present disclosure, the custom connect function may be written in advance during the development stage of the preset application program, and the functionality of the custom connect function is to perform a custom logic. The custom logic may be understood as a logic required for delegation, with the specific content written according to actual needs and not being limited herein. The custom logic may exist in the custom connect function in the form of parameters, which can also be called as custom parameters. Specifically, the custom parameters may be functions or related codes used to implement the custom logic.

Optionally, the custom connect function is injected in the form of a preset parameter. The preset parameter may be input when invoking the preset injection method, and the preset parameter may be understood as an object to be injected. The custom connect function is used as the inject object, i.e., the custom connect function is input to the preset injection method, so as to perform the custom connect function to the second core library.

At step 103, in accordance with a determination that the preset application program invokes the preset connect function via the second core library, the custom connect function is invoked to implement a custom logic so as to delegate the preset socket.

As an example, when the preset application program initiates the network request, if the preset socket needs to be invoked, then the corresponding preset connect function needs to be invoked via the second core library. Since the custom connect function has previously been injected to the second core library, the original preset connect function being currently invoked will not directly be executed, the custom connect function is executed first instead and further the custom logic is performed. At this point, since the preset connect function is not directly executed, a connection with the preset socket cannot directly be established, and thus the preset socket is delegated.

The method for function processing provided in the embodiments of the present disclosure loads the first core library in the preset application program, wherein the first core library injects a proxy connect function to a second core library to perform the centralized management of the invoking of a preset socket, the second core library comprising a preset connect function used to establish a connection with the preset socket. A custom connect function is injected to the second core library based on a preset injection method corresponding to the first core library. In accordance with a determination that the preset application program invokes the preset connect function via the second core library, the custom connect function is invoked instead so as to delegate the preset socket. With the above technical solution, it is not necessary to inject the custom code at each place where the socket needs to be invoked so as to achieve the purpose of delegating the socket. By injecting the custom connect function to the second core library using a preset injection method that can inject a proxy connect function to the second core library, the custom connect function can have the functionality of the proxy connect function to perform the centralized management of the invoking of the preset socket. In other words, with one injection of the custom connect function, the effect of batch injection of multiple delegation codes corresponding to the preset socket can be realized. Therefore, the injection of the codes for socket delegation can be reduced, and the stability and performance of the application program can be guaranteed.

In some embodiments, injecting the custom connect function to the second core library based on the preset injection method corresponding to the proxy connect function comprises: using a preset dynamic library symbol function to look up an address of the corresponding preset injection method corresponding to the proxy connect function; and invoking the preset injection method based on the address of the preset injection method so as to inject the custom connect function to the second core library. An advantage is that the address of the preset injection method provided by the operating system can be found fast and accurately and the preset injection method can be invoked.

The functionality of the dynamic library symbol (dlsym) function is to return an address corresponding to the symbol based on the dynamic link library operation handle and symbol. Not only a function address may be obtained, but also a variable address may be obtained. The preset dynamic library symbol function may be understood as a dlsym function which is written in advance during the development stage of the preset application program and used for looking up the address of the preset injection method, e.g., a dlsym function for looking up an address of the NetdClientInit-Connect method.

In some embodiments, after invoking the custom connect function instead to perform the custom logic, the method further comprises: executing a system call for the preset connect function. Advantageously, after the execution of the custom connection function is completed, the preset connection function is prevented from being invoked again and the custom connect function is prevented from being executed again. Therefore, the occurrence of infinite loop of delegation invoking may be avoided.

As an example, the system call (also called as syscall) is the means for user space to access the kernel and is the legal entry to the kernel. Where the preset connect function is invoked normally, the relevant functions of the bottom layer of the system (also called as the kernel layer) will be invoked by executing the corresponding system calls, and finally the functionality of the preset connect function will be performed. In the embodiments of the present disclosure, after invoking the custom connect function to perform the custom logic, the system call for the preset connect function is directly executed, instead of returning to call the preset connect function. Therefore, the occurrence of infinite loop may be avoided, and the normal running of the preset application program may be guaranteed.

In some embodiment, when a type parameter in the preset connect function is a network socket, the custom logic comprises replacing a destination address of the preset connect function by a target address corresponding to a local server proxy. An advantage is that with the custom logic, the network request may be forwarded to the local server proxy, which facilitates obtaining data transferred between the preset application program and a real server and realizing the acquisition of network data. The network socket may be understood as an ordinary socket which is used for communication between processes running on different computer devices. The local server proxy may be understood as a proxy server implemented inside the preset application program, and the real server may be understood as a remote server with which the preset application program needs to establish the network connection. In the development stage of the preset application program, relevant code for implementing the local server proxy may be written in advance, including a target address corresponding to the local server proxy. Optionally, the target address may comprise an Internet protocol (IP) address corresponding to a local network card of an electronic device, e.g., 127.0.0.1. After the preset application program is started, the local server proxy may be started in the preset application program, and the local server proxy may be bound to the target address. Further, network data may be obtained via the local server proxy, and the acquisition of network data inside the application program may be performed.

In some embodiments, when a type parameter in the preset connect function is a local socket, the custom logic comprises replacing a destination file path in the preset connect function by a target file path corresponding to a local domain name server proxy. An advantage is that with the custom logic, network requests may be forwarded to the local domain name server proxy, which helps to control the network traffic in the domain name parsing stage. The local socket is also called as Unix domain name socket which is used for communication between processes running on the same computer device. Specifically, the local domain name server proxy may be a domain name server proxy based on local socket service and may be understood as a local socket service end for domain name parsing. In the development stage of the preset application program, relevant code for realizing the domain name server proxy may be written in advance, including a target file path corresponding to the domain name server proxy. After the preset application program is started, the domain name server proxy may be started and may be associated to the target file path. When the local socket is invoked, the destination file path in the corresponding connect function is replaced by the target file path. Therefore, the preset application program (also understood as a client of the domain name parsing stage loaded in the preset application program process, e.g., NetdClient in an Android operating system) may be prevented from being directly connected to a real domain name server (e.g., NetdServer in an Android operating system).

Optionally, the logic that replaces a destination address in the preset connect function by a target address corresponding to the local server proxy may be denoted as a first custom logic, and the corresponding custom connect function may be denoted as a first custom connect function; the logic that replaces a destination file path in the preset connect function by a target file path corresponding to the local domain name server proxy may be denoted as a second custom logic, and the corresponding custom connect function may be denoted as a second custom connect function. The first and second custom connect functions may be injected in advance to the second core library. In accordance with a determination that the preset application program invokes the preset connect function via the second core library, the type parameter in the preset connect function may be obtained first. If the type parameter is a network socket, then the first custom connect function is invoked instead to perform the first custom logic. If the type parameter is a local socket, then the second custom connect function may be invoked instead to perform the second custom logic.

Note that other custom logics might exist. The above first and second custom logics are merely illustrative and may be written according to actual needs in practical application program. The embodiments of the present disclosure are not intended to make specific limitation.

Figure 2:
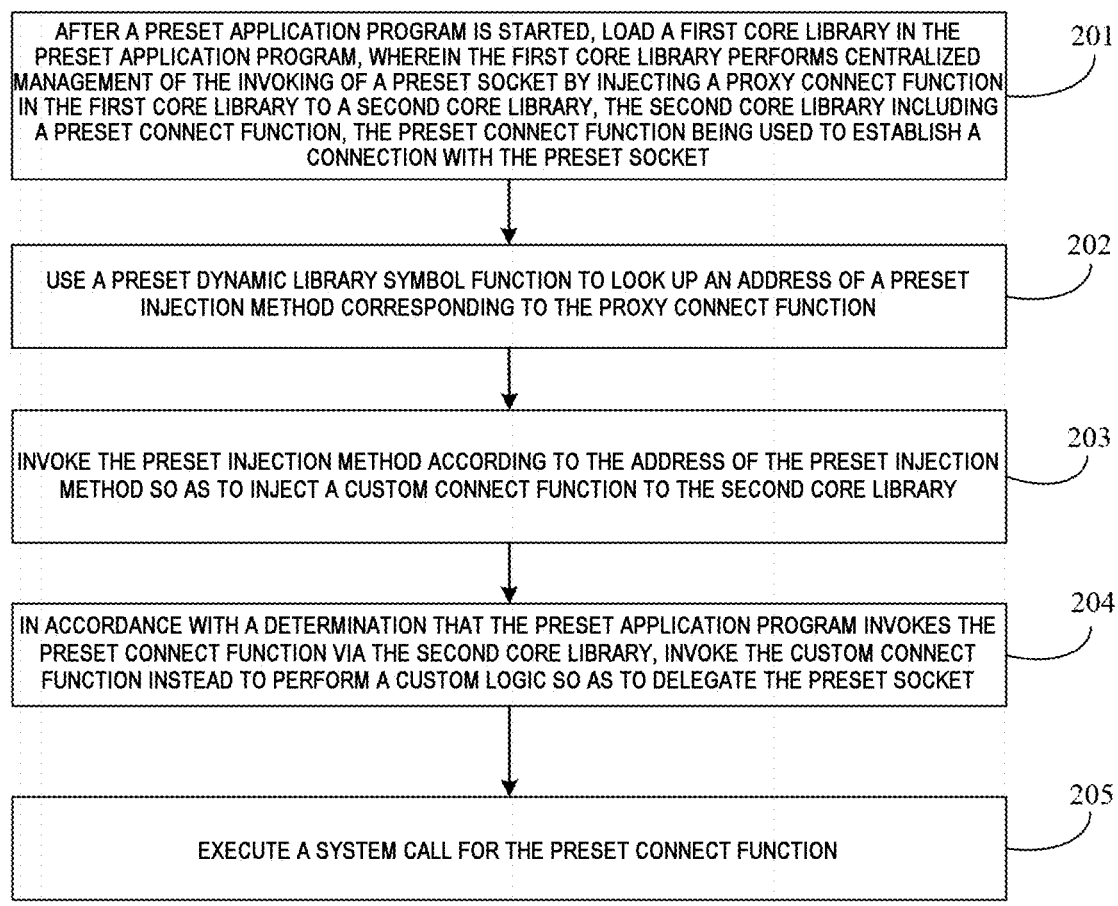
FIG. 2 shows a schematic flowchart of another method for function processing provided by embodiments of the present disclosure.
Figure 3:
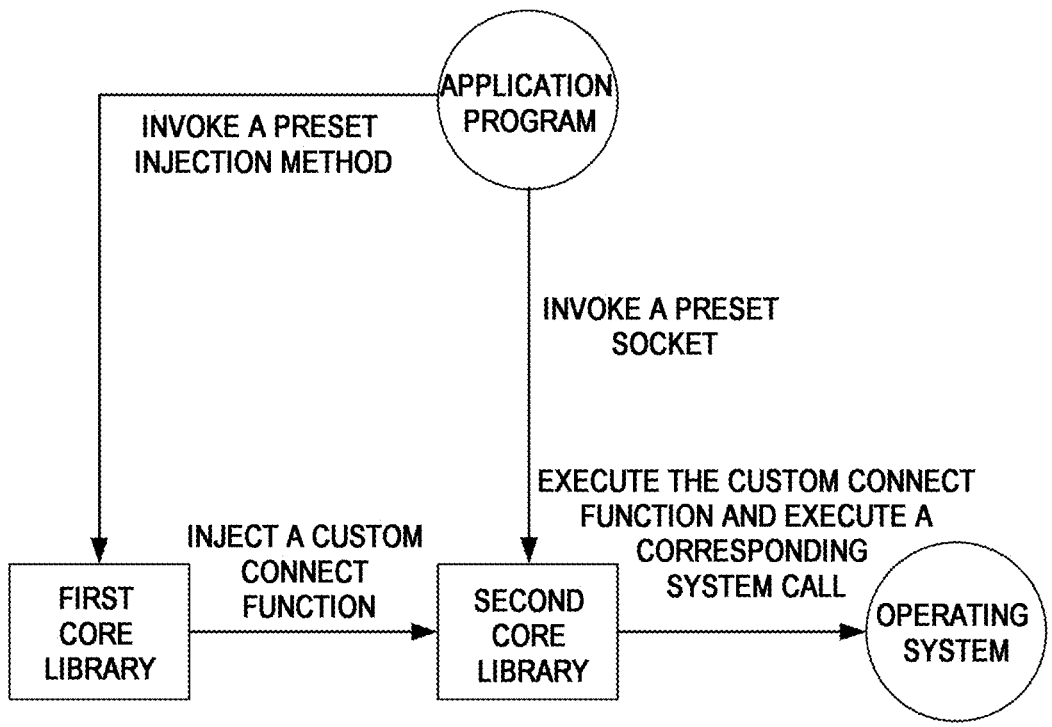
FIG. 3 shows a schematic principle diagram of a method for function processing provided by embodiments of the present disclosure.

FIG. 2 is a schematic flowchart of a method for function processing provided by an embodiment of the present disclosure, the embodiment being optimized based on various optional solutions in the above embodiment. FIG. 3 is a schematic diagram of the principle of a method for function processing provided by an embodiment of the present disclosure, and the embodiment may be understood in conjunction with FIGS. 2 and 3.

Specifically, taking the Android operating system as an example, the method comprises the following steps:

At step 201, after a preset application program is started, a first core library is loaded in the preset application program, wherein the first core library injects a proxy connect function in the first core library to a second core library to perform the centralized management of the invoking of a preset socket, the second core library including a preset connect function, the preset connection function being used to establish a connection with a preset socket.

As an example, after the preset application program is started, a NetdClient library is proactively loaded, i.e., a libnetd_client.so file is loaded.

At step 202, an address of a preset injection method corresponding to the proxy connect function is looked up by using a preset dynamic library symbol function.

As an example, a preset dlsym function may be written in advance in the development stage of the preset application program, the preset application program using the preset dlsym function to look up an address of a NetdClientInitConnect method.

At step 203, the preset injection method is invoked based on the address of the preset injection method to inject a custom connection function to the second core library.

The custom connect function is injected in the form of a preset parameter, the custom connect function being used to perform a custom logic.

As shown in FIG. 3, the preset application program injects the custom connect function to the second core library by invoking the preset injection method in the first core library. Taking Android as an example, the preset application program may call the NetdClientInitConnect method in the NetdClient library and input the custom connect function to inject the same to a Bionic library.

At step 204, in accordance with a determination that the preset application program invokes the preset connect function via the second core library, the custom connect function is invoked instead to perform a custom logic so as to delegate the preset socket.

As shown in FIG. 3, when the preset application program invokes the preset socket, the preset connect function is invoked via the second core library, at which point the custom connect function is invoked, and a corresponding system call is executed.

As an example, when the preset application program initiates a network request, it may be detected that the preset application program invokes the preset connect function in the Bionic library. At this point the custom connect function is invoked instead to implement a logic required by the delegation.

At step 205, a system call for the preset function is executed.

As an example, after the execution of the logic required by the delegation is completed, the system call is used for the underlying operation of the preset connect function, thereby avoiding infinite loop invoking.

With the method for function processing provided by the embodiments of the present disclosure, after the application program is started, the address of the NetdClientInitConnect method in the NetdClient is looked up, and the custom connect function for realizing the custom logic is injected to the Bionic library by invoking the NetdClientInitConnect method. In this case, when the preset application program later invokes an original connect function in the Bionic library, the custom connect function is invoked instead, thereby realizing the custom logic and managing the invoking of the socket. With the solution, code for delegating does not need to be injected at each place in the Bionic library where the preset connect function needs to be invoked, so that the injection of codes for delegation can be reduced, and the stability and performance of the application program can be guaranteed.

Figure 4:
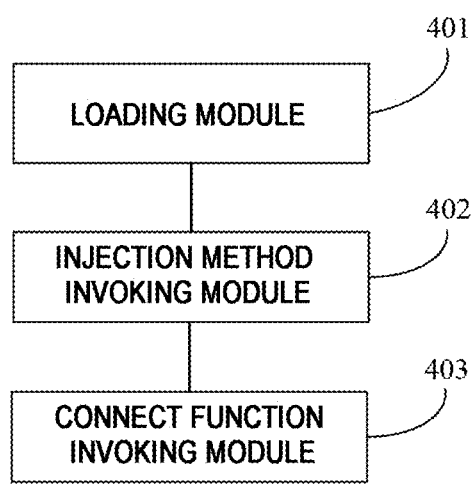
FIG. 4 shows a structural block diagram of an apparatus for function processing provided by embodiments of the present disclosure.

FIG. 4 is a schematic block diagram of an apparatus for function processing provided by an embodiment of the present disclosure, which may be configured in a preset application program, implemented by software and/or hardware, generally integrated in an electronic device and perform the function processing by performing a method for function processing. As depicted, the apparatus comprises: a loading module 401 configured to load a first core library in a preset application program, wherein the first core library injects a proxy connect function in the first core library to a second core library to perform centralized management of the invoking of a preset socket, the second core library including a preset connect function, the preset connect function being used to establish a connection with the preset socket; an injection method invoking module 402 configured to inject a custom connect function to the second core library based on a preset injection method corresponding to the proxy connect function; a connect function invoking module 403 configured to, in accordance with a determination that the preset application program invokes the preset connect function via the second core library, call the custom connect function instead to implement a custom logic so as to delegate the preset socket.

With the apparatus for function processing provided in the embodiments of the present disclosure, it is not necessary to inject the custom code at each place where the socket needs to be invoked so as to achieve the purpose of delegating the socket. By injecting the custom connect function to the second core library by using a preset injection method that can inject a proxy connect function to the second core library, the custom connect function can have the functionality of the proxy connect function to perform the centralized management of the invoking of the preset socket. In other words, with one injection of the custom connect function, the effect of batch injection of multiple delegation codes corresponding to the preset socket can be realized. Therefore, the injection of the codes for delegating socket can be reduced, and the stability and performance of the application program can be guaranteed.

Optionally, the custom connect function is injected in the form of a preset parameter.

Optionally, the preset injection method comprises a method for injecting the proxy connect function to the second core library provided by an operating system.

Optionally, the injection method invoking module comprises: an address lookup unit configured to use a preset dynamic library symbol function to look up an address of a preset injection method corresponding to the proxy connect function; an injection method invoking unit configured to call the preset injection method based on the address of the preset injection method so as to inject a custom connect function to the second core library.

Optionally, the apparatus further comprises a system call executing module configured to, after invoking the custom connect function instead to perform the custom logic, execute a system call for the preset connect function.

Optionally, the operating system comprises an Android operating system, the first core library comprising a NetdClient library, the second core library comprising a Bionic library, the preset injection method comprising a NetdClientInitConnect method.

Optionally, when a type parameter in the preset connect function is a network socket, the custom logic comprises replacing a destination address in the preset connect function by a target address corresponding to a local server proxy.

Optionally, when a type parameter in the preset connect function is a local socket, the custom logic comprises replacing a destination file path in the preset connect function by a target file path corresponding to a local domain name server proxy.

Figure 5:
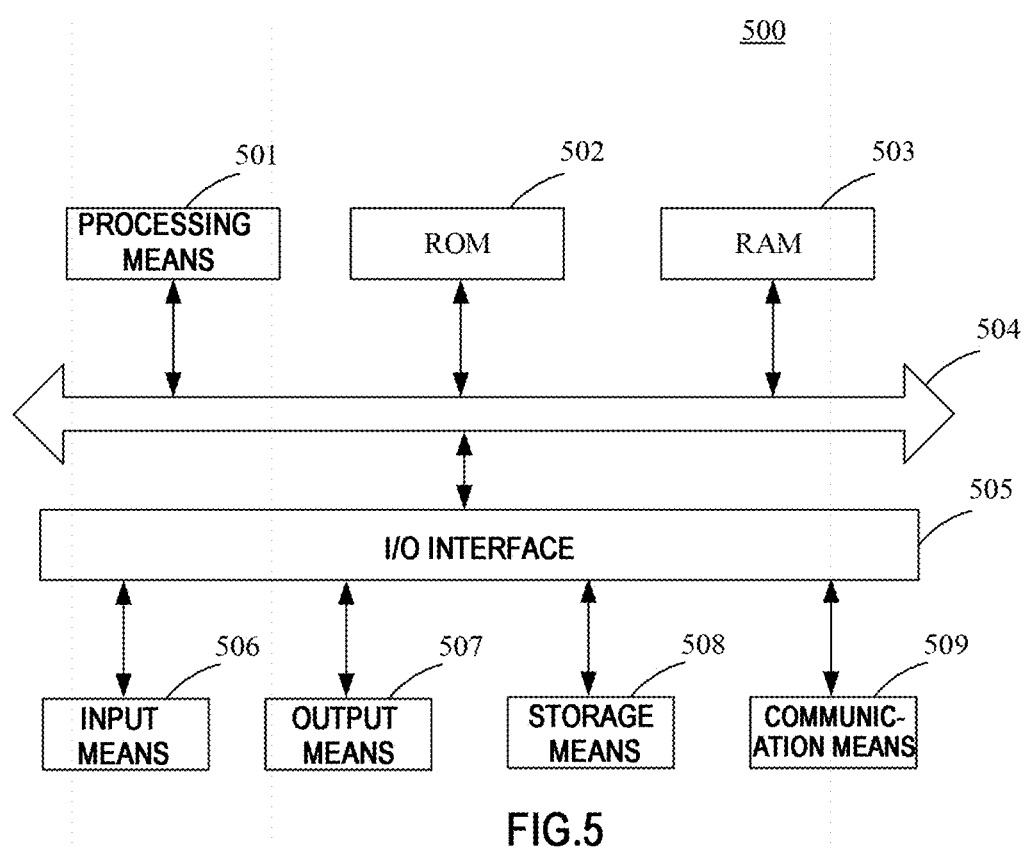
FIG. 5 shows a structural block diagram of an electronic device provided by embodiments of the present disclosure.

With reference to FIG. 5 below, the figure shows a schematic block diagram of an electronic device 500 suitable for implementing embodiments of the present disclosure. The electronic device in the embodiments of the present disclosure may include, without limitation to, a mobile terminal such as a mobile phone, a notebook computer, a digital broadcast receiver, PDA (personal digital assistant), PDA (tablet computer), PMP (portable multimedia player) and a vehicle terminal (e.g., a vehicle navigation terminal), and a fixed terminal such as a digital TV and a desktop computer. The electronic device shown in FIG. 5 is merely an example and not intended to limit the functionality and application scope of the embodiments of the present disclosure.

As shown in FIG. 5, the electronic device 500 may comprise processing means (e.g., a central processor, a graphics processor, etc.) 501 which is capable of performing various appropriate actions and processes in accordance with a program stored in a read only memory (ROM) 502 or a program loaded from storage means 508 to a random access memory (RAM) 503. In the RAM 503, there are also stored various programs and data required by the electronic device 500 when operating. The processing means 501, the ROM 502 and the RAM 503 are connected to one another via a bus 504. An input/output (I/O) interface 505 is also connected to the bus 504.

Usually, the following means are connected to the I/O interface 505: input means 506 including a touch screen, a touch tablet, a keyboard, a mouse, a camera, a microphone, an accelerometer, a gyroscope or the like; output means 507 including a liquid crystal display, a loudspeaker a vibrator or the like; storage means 508, including a magnetic tape, a hard disk or the like; and communication means 509. The communication means 509 allows the electronic device 500 to exchange information/data with other device in a wireless or wired way. Although FIG. 5 shows the electronic device 500 with various means, it should be understood that it does not require to implement or have all the shown means. Alternatively, more or less means may be implemented or comprised.

In particular, the procedures described with reference to the flowchart according to the embodiments of the present disclosure may be implemented as a computer software program. For example, the embodiments of the present disclosure comprise a computer program product, which comprises a computer program carried on a non-transient computer readable medium, the computer program containing program code for performing the method shown in the flowchart. In such an embodiment, the computer program may be downloaded from the network and installed via the communication means 509, or installed from the storage means 508, or installed from the ROM 502. The computer program, when executed by the processing means 501, may execute the above functions defined in the method according to the embodiments of the present disclosure.

It is noteworthy that the computer readable medium can be a computer readable signal medium or a computer readable storage medium or any combination thereof. The computer readable storage medium may be, for example, but is not limited to, an electronic, magnetic, optical, electromagnetic, infrared, semiconductor system, means or device, or any suitable combination of the foregoing. More specific examples of the computer readable storage medium include the following: an electric connection with one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the present disclosure, the computer readable storage medium may be any tangible medium containing or storing a program which may be used by an instruction executing system, apparatus or device or used in conjunction therewith. In the present disclosure, the computer readable signal medium may include a data signal propagated in baseband or as part of a carrier wave, with computer readable program code carried therein. The data signal propagated as such may take various forms, including without limitation to, an electromagnetic signal, an optical signal or any suitable combination of the foregoing. The computer readable signal medium may further be any other computer readable medium than the computer readable storage medium, which computer readable signal medium may send, propagate or transmit a program used by an instruction executing system, apparatus or device or used in conjunction with the foregoing. The program code included in the computer readable medium may be transmitted using any suitable medium, including without limitation to, an electrical wire, an optical fiber cable, RF (radio frequency), etc., or any suitable combination of the foregoing.

The above computer readable medium may be included in the above-mentioned electronic device; and it may also exist alone without being assembled into the electronic device.

The computer readable medium carries one or more programs which, when executed by the electronic device, cause the electronic device to: load a first core library in a preset application program, wherein the first core library injects a proxy connect function in the first core library to a second core library to perform centralized management of the invoking of a preset socket, the second core library including a preset connect function, the preset connect function being used to establish a connection with the preset socket; inject a custom connect function to the second core library based on a preset injection method corresponding to the proxy connect function; in accordance with a determination that the preset application invokes the preset connect function via the second core library, call the custom connect function instead to implement a custom logic so as to delegate the preset socket.

Computer program codes for carrying out operations of the present disclosure may be written in one or more programming languages, including without limitation to, an object oriented programming language such as Java, Smalltalk, C++ or the like, and conventional procedural programming languages, such as the "C" programming language or similar programming languages. The program codes may execute entirely on the user's computer, partly on the user's computer, as a stand-alone software package, partly on the user's computer and partly on a remote computer or entirely on the remote computer or server. In the latter scenario, the remote computer may be connected to the user's computer via any type of network, including a local area network (LAN) or a wide area network (WAN), or the connection may be made to an external computer (for example, via the Internet using an Internet Service Provider).

The flowchart and block diagrams in the figures illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The modules described in the embodiments of the present disclosure may be implemented as software or hardware. Wherein the name of a module does not form any limitation to the module per se. For example, the domain name server proxy starting module may further be described as "a module starting a domain name server proxy based on local socket service in the preset application program."

The functions described above may be executed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In the context of the present disclosure, the machine readable medium may be a tangible medium, which may include or store a program used by an instruction executing system, apparatus or device or used in conjunction with the foregoing. The machine readable medium may be a machine readable signal medium or a machine readable storage medium. The machine readable medium may include, but is not limited to, an electronic, magnetic, optical, electromagnetic, infrared, semiconductor system, means or device, or any suitable combination of the foregoing. More specific examples of the machine readable storage medium include the following: an electric connection with one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

According to one or more embodiments of the present disclosure, there is provided a method for function processing, comprising: loading a first core library in a preset application program, wherein the first core library injects a proxy connect function in the first core library to a second core library to perform centralized management of the invoking of a preset socket, the second core library including a preset connect function, the preset connect function being used to establish a connection with the preset socket; injecting a custom connect function to the second core library based on a preset injection method corresponding to the proxy connect function; in accordance with a determination that the preset application program invokes the preset connect function via the second core library, invoking the custom connect function instead to implement a custom logic so as to delegate the preset socket.

Further, the custom connect function is injected in the form of a preset parameter.

Further, the preset injection method comprises a method for injecting the proxy connect function to the second core library provided by an operating system.

Further, injecting the custom connect function to the second core library based on the preset injection method corresponding to the proxy connection function comprises: using a preset dynamic library symbol function to look up an address of a preset injection method corresponding to the proxy connect function; invoking the preset injection method based on the address of the preset injection method so as to inject the custom connect function to the second core library.

Further, after invoking the custom connect function to perform the custom logic, the method further comprises executing a system call for the preset connect function.

Further, the operating system comprises an Android operating system, the first core library comprising a NetdClient library, the second core library comprising a Bionic library, the preset injection method comprising a NetdClientInit-Connect method.

Further, when a type parameter in the preset connect function is a network socket, the custom logic comprises replacing a destination address in the preset connect function by a target address corresponding to a local server proxy.

Further, when a type parameter in the preset connect function is a local socket, the custom logic comprises replacing a destination file path in the preset connect function by a target file path corresponding to a local domain name server proxy.

According to one or more embodiments of the present disclosure, there is provided an apparatus for function processing, comprising: a loading module configured to load a first core library in a preset application program, wherein the first core library injects a proxy connect function in the first core library to a second core library to perform centralized management of the invoking of a preset socket, the second core library including a preset connect function, the preset connect function being used to establish a connection with the preset socket; an injection method invoking module configured to inject a custom connect function to the second core library based on a preset injection method corresponding to the proxy connect function; a connect function invoking module configured to, in accordance with a determination that the preset application program invokes the preset connect function via the second core library, call the custom connect function instead to implement a custom logic so as to delegate the preset socket.

The foregoing description merely illustrates the preferable embodiments of the present disclosure and used technical principles. Those skilled in the art should understand that the scope of the present disclosure is not limited to technical solutions formed by specific combinations of the foregoing technical features and also cover other technical solution formed by any combinations of the foregoing or equivalent features without departing from the concept of the present disclosure, such as a technical solution formed by replacing the foregoing features with the technical features disclosed in the present disclosure (but not limited to) with similar functions.

In addition, although various operations are depicted in a particular order, this should not be construed as requiring that these operations be performed in the particular order shown or in a sequential order. In a given environment, multitasking and parallel processing may be advantageous. Likewise, although the above discussion contains several specific implementation details, these should not be construed as limitations on the scope of the present disclosure. Certain features that are described in the context of separate embodiments can also be implemented in combination in a single embodiment. Conversely, various features that are described in the context of a single embodiment can also be implemented in multiple embodiments separately or in any suitable sub-combination.

Although the subject matter has been described in language specific to structural features and/or method logical acts, it is to be understood that the subject matter defined in the appended claims is not necessarily limited to the specific features or acts described above. On the contrary, the specific features and acts described above are merely example forms of implementing the claims.

I claim:

1. A method for function processing, comprising:
   loading a first core library in a preset application program, wherein the first core library injects a proxy connect function in the first core library to a second core library to perform centralized management of invoking of a preset socket by using a preset injection method, the second core library including a preset connect function, the preset connect function being used to establish a connection with the preset socket;
   determining an address of the preset injection method;
   injecting, based on the address of the preset injection method, a custom connect function to the second core library by using the preset injection method; and
   in accordance with a determination that the preset application program invokes the preset connect function via the second core library, invoking the custom connect function instead to implement a custom logic so as to delegate the preset socket,
   wherein the preset injection method comprises a method for injecting the proxy connect function to the second core library provided by an operating system,
   wherein determining an address of the preset injection method comprises using a preset dynamic library symbol function to look up an address of the preset injection method corresponding to the proxy connect function, and
   wherein injecting the custom connect function to the second core library comprises invoking the preset injection method based on the address of the preset injection method so as to inject the custom connect function to the second core library.

2. The method according to claim 1, wherein the custom connect function is injected in a form of a preset parameter.

3. The method according to claim 2, wherein when a type parameter in the preset connect function is a network socket, the custom logic comprises replacing a destination address in the preset connect function by a target address corresponding to a local server proxy.

4. The method according to claim 2, wherein when a type parameter in the preset connect function is a local socket, the custom logic comprises replacing a destination file path in the preset connect function by a target file path corresponding to a local domain name server proxy.

5. The method according to claim 1, further comprising:
   after invoking the custom connect function instead to perform the custom logic, executing a system call for the preset connect function.

6. The method according to claim 5, wherein when a type parameter in the preset connect function is a network socket, the custom logic comprises replacing a destination address in the preset connect function by a target address corresponding to a local server proxy.

7. The method according to claim 5, wherein when a type parameter in the preset connect function is a local socket, the custom logic comprises replacing a destination file path in the preset connect function by a target file path corresponding to a local domain name server proxy.

8. The method according to claim 1, wherein the operating system comprises an Android operating system, the first core library comprising a NetdClient library, the second core library comprising a Bionic library, the preset injection method comprising a NetdClientInitConnect method.

9. The method according to claim 8, wherein when a type parameter in the preset connect function is a network socket, the custom logic comprises replacing a destination address in the preset connect function by a target address corresponding to a local server proxy.

10. The method according to claim 1, wherein when a type parameter in the preset connect function is a network socket, the custom logic comprises replacing a destination address in the preset connect function by a target address corresponding to a local server proxy.

11. The method according to claim 1, wherein when a type parameter in the preset connect function is a local socket, the custom logic comprises replacing a destination file path in the preset connect function by a target file path corresponding to a local domain name server proxy.

12. An electronic device, comprising: a memory, a processor and a computer program which is stored on the memory and executable on the processor, the processor executing the computer program to implement the method according to claim 1.

13. A non-transitory computer readable storage medium storing instructions that, when executed by a processor, cause the processor to implement the method according to claim 1.

14. An apparatus for function processing, comprising a processor and memory with instructions thereon, wherein the instructions upon execution by the processor, cause the processor to:

load a first core library in a preset application program, wherein the first core library injects a proxy connect function in the first core library to a second core library to perform centralized management of invoking of a preset socket by using a preset injection method, the second core library including a preset connect function, the preset connect function being used to establish a connection with the preset socket;

determine an address of the preset injection method;

inject, based on the address of the preset injection method, a custom connect function to the second core library by using the preset injection method; and in accordance with a determination that the preset application program invokes the preset connect function via the second core library, call the custom connect function instead to implement a custom logic so as to delegate the preset socket, wherein the preset injection method comprises a method for injecting the proxy connect function to the second core library provided by an operating system, wherein determining an address of the preset injection method comprises using a preset dynamic library symbol function to look up an address of the preset injection method corresponding to the proxy connect function, and wherein injecting the custom connect function to the second core library comprises invoking the preset injection method based on the address of the preset injection method so as to inject the custom connect function to the second core library.

\* \* \* \* \*